US006055417A

United States Patent [19]

Hill et al.

[11] Patent Number: 6,055,417

[45] Date of Patent: Apr. 25, 2000

[54] SYSTEM FOR USING A MICROPHONE IN AN OBJECT AT A SPORTING EVENT

[75] Inventors: David Blyth Hill, Pacific Palisades, Calif.; Jerry Neil Gepner, Langhorn, Pa.

[73] Assignee: Fox Sports Productions, Inc., Los Angeles, Calif.

[21] Appl. No.: 08/971,470

[22] Filed: Nov. 17, 1997

Related U.S. Application Data

[63] Continuation of application No. 08/638,552, Apr. 26, 1996, abandoned.

[51] Int. Cl.[7] .......... H04B 1/02

[52] U.S. Cl. .......... 455/90; 455/128; 455/347; 455/66

[58] Field of Search .......... 455/66, 89, 90, 455/91, 95, 97, 100, 128, 344, 347, 351; 381/355, 360, 361, 368

[56] References Cited

U.S. PATENT DOCUMENTS

| | | | |
|---|---|---|---|
| 4,048,561 | 9/1977 | Wilcox et al. | 455/120 X |
| 4,493,486 | 1/1985 | Fuller et al. | 273/25 |
| 4,570,746 | 2/1986 | Das et al. | 381/158 |
| 4,627,620 | 12/1986 | Yang | 273/454 X |
| 4,975,713 | 12/1990 | Sheriff | 343/795 |
| 5,080,356 | 1/1992 | Green et al. | 273/25 |
| 5,142,700 | 8/1992 | Reed | 455/90 X |
| 5,161,250 | 11/1992 | Ianna et al. | 455/66 |
| 5,319,805 | 6/1994 | Holcomb et al. | 455/347 X |
| 5,493,697 | 2/1996 | May | 455/66 |

FOREIGN PATENT DOCUMENTS

| | | |
|---|---|---|
| 342227/84 | 4/1985 | Australia . |
| 2 150 792 | 7/1985 | United Kingdom . |

*Primary Examiner*—Wellington Chin
*Assistant Examiner*—Philip J. Sobutka
*Attorney, Agent, or Firm*—Fliesler, Dubb, Meyer & Lovejoy LLP

[57] ABSTRACT

A system for using a microphone at a sporting event which includes mounting a microphone and a transmitter inside an object on the playing field. The microphone senses audio data and the transmitter send the audio data to a receiver. The receiver communicates the audio data to a mixer which can insert the audio data into a television or radio signal.

10 Claims, 2 Drawing Sheets

SYSTEM FOR USING A MICROPHONE IN AN OBJECT AT A SPORTING EVENT

This application is a continuation of Ser. No. 08/638,552, filed Apr. 26, 1996, now abandoned.

BACKGROUND OF THE INVENTION

1. Field of the Invention

The present invention is directed to a system for using a microphone in an object at a sporting event.

2. Description of the Related Art

When attending a sporting event, it is advantageous to have seats close to the playing field in order to see well and hear the sounds of the game. For example, when attending a baseball game fans in seats close to the field can hear the sounds of the bat hitting the ball, the ball being caught, players sliding into a base, collisions, etc. Viewers and listeners of broadcasted sporting events cannot hear these sounds and, therefore, tend to feel isolated from the game and do not always get drawn into the excitement of the event. If broadcasters could make the viewers and listeners feel closer to and more involved with the game, viewers would be less likely to turn off the television (or radio), change channels or focus their attention elsewhere. Thus, there is a need to allow viewers and listeners to hear more sounds from the playing field so that they feel closer to and more involved with the game.

In the past, television broadcasters have put microphones on referees and have installed microphones around, but outside of, the playing field. The microphones around the paying field can pick up spurious crowd noise and noise from players when the players are not on the field. However, these microphones do not reliably pick up sounds from the playing field. Other attempts to broadcast sounds from the playing field include hanging microphones from the ceiling of indoor arenas. These microphones, however, do not get close enough to the playing field to detect all of the interesting sounds and this solution is not practical for an outdoor stadium.

Thus, there is a need for a system that uses microphones within the playing field at do not interfere with the play or view of the sporting event, and that can reliably pick up and transmit for broadcast the sounds from the playing field.

SUMMARY OF THE INVENTION

The present invention is directed to overcome the disadvantages of the prior art. Thus, the present invention provides for a system for using a microphone in an object at a sporting event. The system, roughly described, includes a miniaturized microphone and wireless transmitter, both of which are mounted within the object. In one embodiment the system also includes an antenna connected to the transmitter for transmitting an RF signal. The transmitter transmits the RF signal to a receiver. The transmitter, the antenna and the microphone are mounted within the object such that they do not obtrusively protrude outside the object and interfere with the view or play of the sporting event.

The present invention can be used with various sporting events. One embodiment of the present invention includes a base for use during a baseball game. The base includes a base body, a transmitter disposed within the base body, and a microphone disposed within the base body and connected to the transmitter. One alternative includes an antenna connected to the transmitter and a grill covering the microphone. The transmitter and the microphone can be individually covered with protective coverings in order to shield these devices from dust and/or moisture.

It is contemplated that during a baseball game three bases would utilize the principles of the present invention (first base, second base and third base). Each base would transmit an RF signal at a different frequency. The transmitter frequencies are selectable from a predetermined set of frequencies. Each of the bases would transmit to a separate receiver and the respective receivers would transmit the signals to a mixer. The mixer chooses which, if any, of the audio signals are to be inserted into the broadcast signal for television/radio broadcast.

These and other objects and advantages of the invention will appear more clearly from the following description in which the preferred embodiment of the invention has been set forth in conjunction with the drawings.

DETAILED DESCRIPTION

Figure 1:
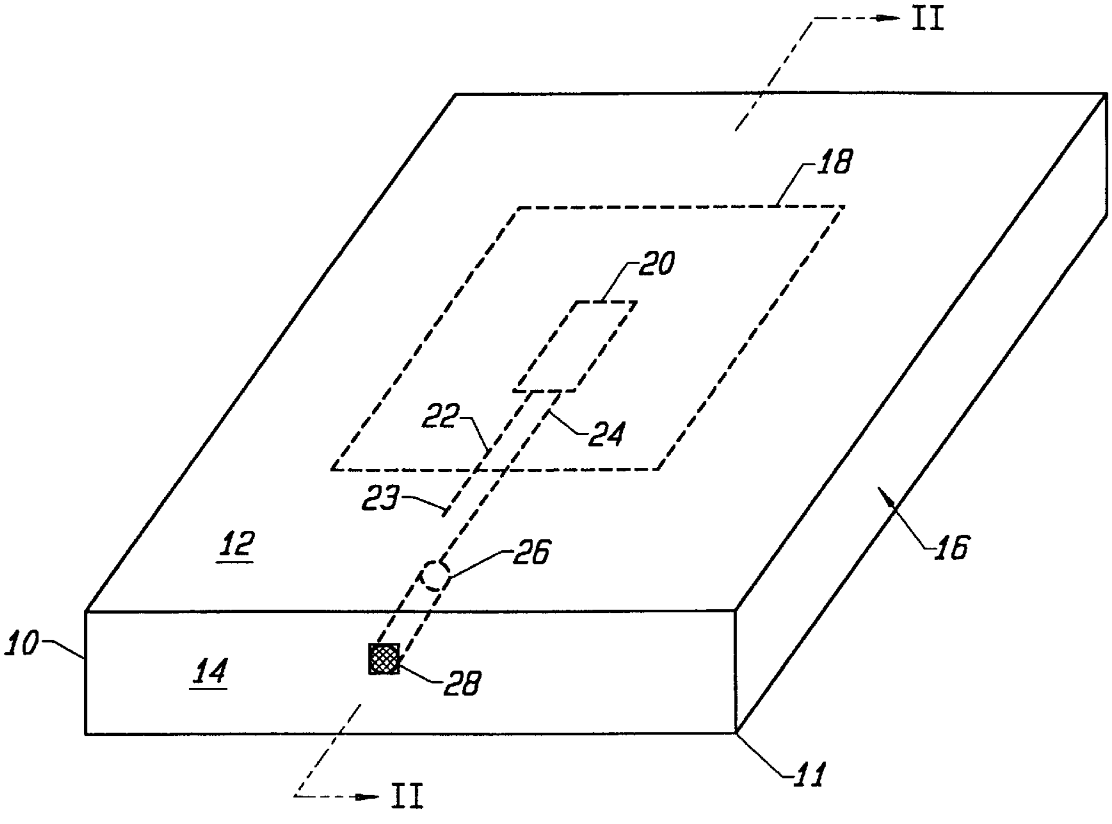
FIG. 1 depicts a perspective view of a baseball base according to the present invention.

FIG. 1 shows a base 10 which utilizes the current invention. Base 10 can be used as first base, second base or third base. It is also contemplated that the principles of the current invention could be used in a pitcher's mound or other object on the field at a sporting event. Base 10, which is of the standard dimensions and feel of regulation baseball bases, includes a base body 11 having a top surface 12 and four side surfaces (two side surfaces 14 and 16 are depicted in FIG. 1). Dotted fine 18 represents a cavity 34 (see FIG. 2) inside base 10.

Mounted inside cavity 34 of base body 11 is a wireless transmitter 20. In the disclosed embodiment, transmitter 20 is an RF transmitter. Transmitters which utilize other spectrums are also within the spirit of the present invention. One example of an RF transmitter suitable for this application is the SK250 UHF transmitter sold by Sennheiser. The SK250 is a miniature turntable transmitter with output power of 250 mW. LEMO connectors are used to connect a microphone and antenna, screening out external interference. The frequency range of the SK250 is 450–960 MHz and the SK250 is capable of transmitting on any one of 32 preprogrammed channels. Transmitter 20 is powered by three AA batteries. Transmitter 20 is approximately 4.6"×2.4"×0.7" and weighs 9.25 oz. Transmitter 20 is completely covered by a plastic sleeve in order to protect against moisture and dust.

Antenna connector 22 connects transmitter 20 to antenna 23, which is a whip antenna that is supplied with the SK250. Antenna 23 extends into base body 11. Other antennas that fit unobtrusively within base 10 can also be used; for example, a flat mesh antenna, a ribbon style antenna, a dipole antenna made from a flexible material and other antennas can be used. The inventors contemplate that alternative transmitters may not need an external antenna.

Microphone connector 24 connects transmitter 20 to microphone 26. Microphone 26 is miniature high quantity microphone. One example of a microphone suitable for this application is the MKE102 sold by Sennheiser, which is highly immune to moisture. Microphone 26 is approximately 3/16 of an inch in diameter with a length of ¼ of an inch, and is mounted so that the front of microphone 26 is flush with side 14. An optional protective coating can be placed in front of microphone 26 to protect microphone 26 from dust and moisture. One example of a suitable protective covering is a latex membrane. The inventors note that a protective coating in front of the microphone could effect the performance of the microphone. Mounted in front of microphone 26 is a square shaped grill 28, having sides approximately ¼ of an inch long. Although grill 28 is mounted on surface 14, part of surface 14 is carved out and grill 28 is thin so that it appears to be flush with surface 14. In one embodiment, microphone 26 can be mounted in a slightly recessed position so that grill 28 can be mounted flush with surface 14. Preferably, grill 28 is the same color as surface 14. Alternative embodiments can be used without a grill. Transmitter 20 and microphone 26 are shown by dotted lines in FIG. 1 because they are not visible when looking at base 10 from a perspective view.

Figure 2:
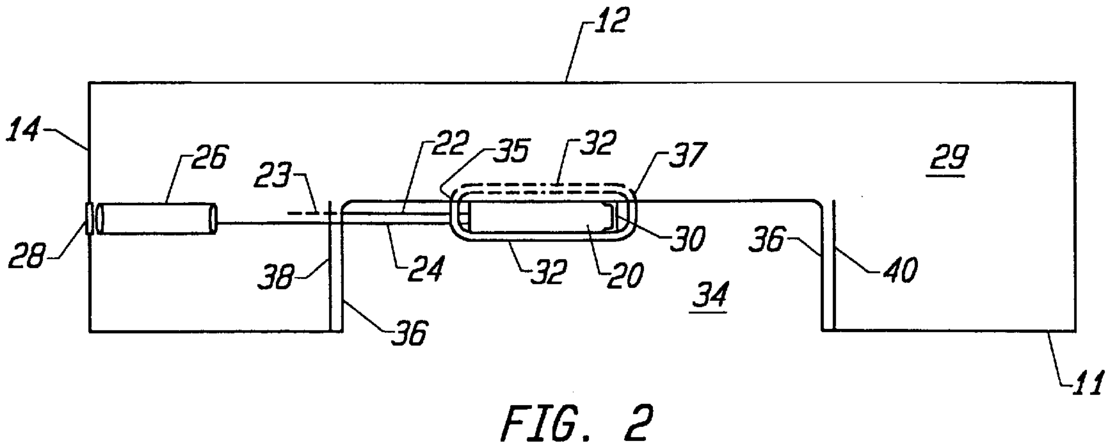
FIG. 2 is a cross-sectional view of the baseball base of FIG. 1.

FIG. 2 is a cross-sectional view of base 10 which shows how the components are mounted in base 10. The interior of base body 11 is made of a foam compound or any other suitable material. Inside base 10 is a cavity 34. Cavity 34 is open at its bottom so that if base 10 is turned upside down, cavity 34 can be accessed. When base 10 is placed on the ground, cavity 34 is defined by base plate 36 and the ground. Base plate 36 is a metal structure that has four sides and a top, similar to an upside down square cup. The edges between the sides and the top are rounded. Attached to each side of base plate 36 is a metal side plate. FIG. 2 shows side plate 38 and side plate 40.

Transmitter 20 is mounted to base plate 36 using a retaining bar 30 and a tye wrap 32. Retaining bar 30 is an extruded aluminum channel used to support the rear end of transmitter 20 and to seal the plastic sleeve covering transmitter 20. Tye wrap 32 is a plastic band that cannot be loosened without breaking after it has been tightened and secured. Two holes 35 and 37 are drilled through base plate 36. Tye wrap 32 is threaded around transmitter 20, through hole 35, through interior 29 and out through hole 37; thereby, holding transmitter 20 securely against base plate 36. In one embodiment, the holes 35 and 37 in baseplate 36 have a diameter of ⅜ of an inch and include rubber grommets. Although tye wrap 32 is shown wrapped around the length of transmitter 20, it can also be wrapped around the width of transmitter 20 instead of or in addition to the length. The arrangement shown in FIG. 2 allows for access to the transmitter for programming, repair, etc. Other mounting schemes can be used to secure transmitter 20 to base plate 36 including schemes that do not use tye mounts or retaining bars. Additionally, transmitter 20 can be secured within bases that do not have a base plate.

Microphone 26 sits inside interior 29. One method for positioning microphone 26 is to drill a hole from cavity 34 into interior 29 and inserting the microphone into the drilled hole.

Figure 3:
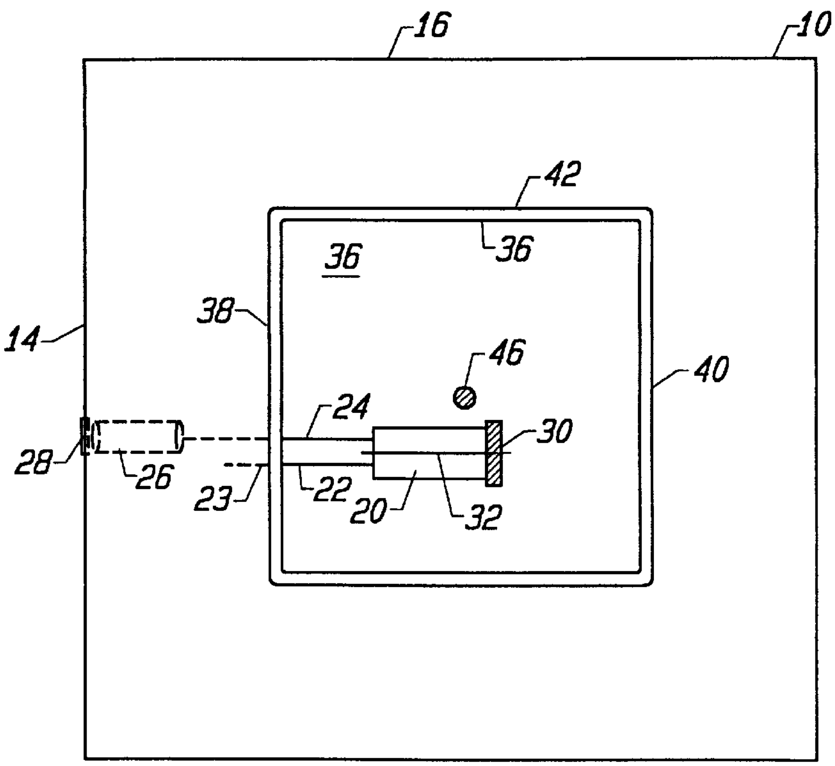
FIG. 3 is a view of the bottom of the baseball base of FIG. 1.

FIG. 3 shows the bottom of base 10. Microphone 26 is shown dotted because it is inside base 10 and cannot be seen from the bottom of base 10. Attached to the center of base plate 36 is a mounting post 46 which is used to mount base 10 to the field of play. FIG. 3 shows the side plates 38, 40, 42 and 44 which were referenced above with respect to FIG. 2. The side plates are ½ inch wide and have a length equal to a side of the base plate. Note that there is a ¼ inch gap between the side plates and the base plate 36. The side plates are used for support in the base. The current invention will work with bases that do not have side plates.

Transmitter 20 and microphone 26 are said to be completely disposed within said base body because they do not protrude from any of the visible surfaces of the base body. Although transmitter 20 can be seen if the base is turned upside down, the transmitter is not protruding from a visible surface because base 10 is normally seated on the infield, thereby, hiding transmitter 20. The visible surfaces of base 10 includes the top surface and four sides. FIG. 3 shows transmitter 20 mounted to base plate 36 off centered to accommodate mounting post 46. Transmitter 20 can be mounted in alternate locations on base plate 36 or suspended in cavity 34 as long as transmitter 20 is in a suitable position to connect to microphone 26 and antenna 23.

Figure 4:
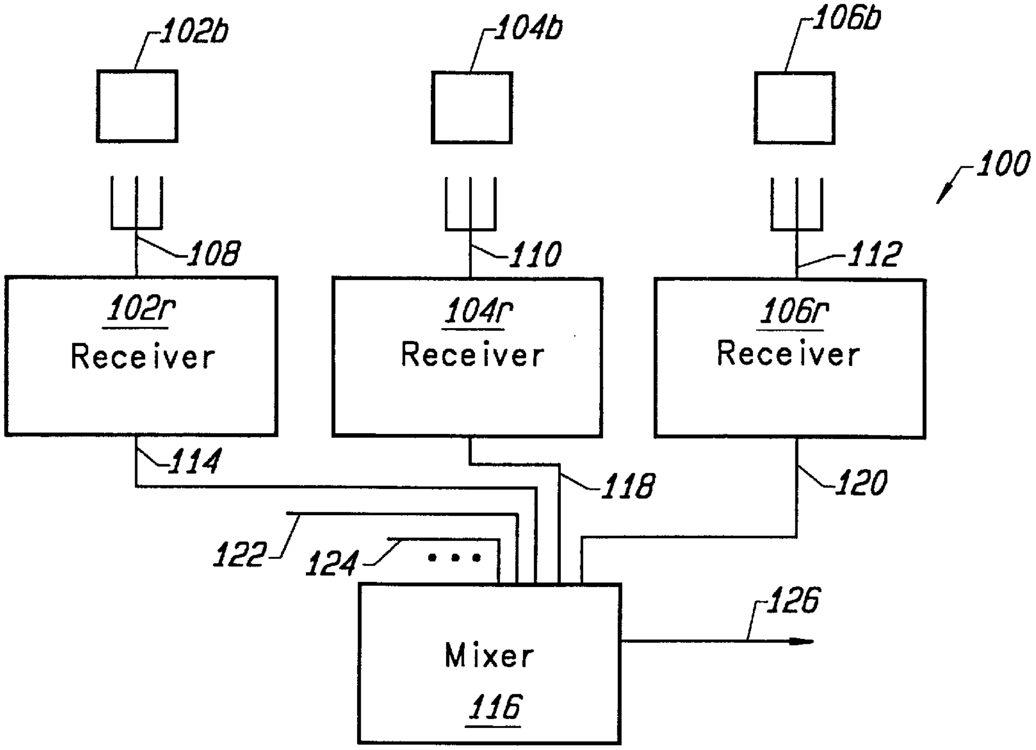
FIG. 4 is a block diagram of a system which uses the baseball base of FIG. 1.

FIG. 4 is a block diagram of one exemplar system 100 which can be used with three baseball bases **102*b*, 104*b* and 106*b* which utilize the technology described above with respect to base 10. It is assumed, but not necessary, that base 102*b* is first base, base 104*b* is second base and base 106*b* is third base from other signals. Note that there is no difference between the bases other than that each base is programmed to transmit on a different frequency. Base 10 can be used as first base, second base or third base; therefore, base 10 is said to be modular. Each base transmits its signal on a different frequency so that the signal can be distinguished. System 100 includes three receivers 102*r*, 104*r* and 106*r*. Receiver 102*r* is turned to receive the signal from base 102*b* via antenna 108. Receiver 104*r* is tuned to receive the signal from base 104*b* via antenna 110. Receiver 106*r* is tuned to receive the signal from base 106*b* via antenna 112. Many suitable RF receivers can be used. One exemplar receiver is the EM203 multi-channel receiver system sold by Sennheiser. The EM203 includes a chassis that houses three receivers. Each of the receivers sends a signal to mixer 116. Various alternatives include having the receivers filter, amplify or perform other operations on the received signal prior to transmission to mixer 116. In one embodiment a receiver can simply transmit the received signal to mixer 116**. Furthermore, some suitable receivers may not need an external antenna.

Mixer 116 receives the signals from the three receivers (**102*r*, 104*r* and 106*r*) as well as other audio sources (depicted by line 122, line 124 and the three dots). The other audio sources can include additional receivers, microphones, tape decks, disc players, etc. Mixer 116 transmits one or more of the audio signals it receives, via signal 126, to broadcast or recording equipment. For example, the output 126 can be added to the audio portion of a television signal or can be sent to headphones for the announcers to hear. Mixer 126** can be operated to ignore all of the audio input, output one of the inputs or output a combination of inputs.

The system 100 can be used in conjunction with television or radio broadcasts during a baseball game. During the game, microphone 126 will pick up sounds from the field of play. The audio signal from microphone 126 is sent by transmitter 20 to one of the receivers which passes the signal to mixer 116. An operator of mixer 116 can choose to ignore or use the audio signal from a particular microphone. For example, if the operator can see that there is no action near third base, then the operator may choose to ignore any audio from the microphone inside third base. The operator may also listen to the audio signal from the third base microphone and decide whether to use the signal based on what can be heard. When the operator uses mixer 116 to select the audio signal from one or more microphones, those audio signals can be broadcasted with the television signal or radio signal so that viewers/listeners can hear the sounds of the game as if the viewer/listener had a front row seat. Since the microphone and transmitter are housed within the base, do not protrude from a visible surface of the base, and do not alter the size, shape or feel of the base, there is no distraction to the players and fans at the stadium.

The foregoing detailed description of the invention has been presented for purposes of illustration and description. It is not intended to be exhaustive or to it the invention to the precise form disclosed, and obviously many modifications and variations are possible in light of the above teaching. The described embodiments of the system for using a microphone in an object at a sporting event were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for using a microphone in a baseball base, comprising:

a baseball base, said baseball base having a cavity and an interior body region surrounding said cavity;

a transmitter secured to and completely disposed within said baseball base, said transmitter is secured in said cavity; and a microphone completely disposed within said baseball base and connected to said transmitter, said microphone is positioned in said interior body region.

2. A system according to claim 1, wherein:

said transmitter is wireless.

3. A system according to claim 1, further including:

a grill covering said microphone.

4. A system according to claim 1, further including:

an antenna connected to said transmitter.

5. A system according to claim 4, wherein:

said antenna is a flat mesh antenna.

6. A system according to claim 1, further including:

a protective covering wrapped around said transmitter.

7. A system according to claim 1, wherein:

said transmitter is a RF transmitter.

8. A system according to claim 1, wherein:

said transmitter is turnable to one of a predetermined plurality of frequencies.

9. A system according to claim 1, further including:

a protective covering for said microphone.

10. A system according to claim 9, wherein:

said protective covering is a latex membrane.

* * * * *

UNITED STATES PATENT AND TRADEMARK OFFICE

CERTIFICATE OF CORRECTION

PATENT NO. : 6,055,417
DATED : April 25, 2000
INVENTOR(S) : Hill et al.

It is certified that error appears in the above-identified patent and that said Letters Patent is hereby corrected as shown below:

Title page,
Please add last inventor to Item [75] Inventors: -- Alan D. Meis, Punta Gorda, Florida --

Signed and Sealed this

Twelfth Day of February, 2002

*Attest:*

JAMES E. ROGAN

*Attesting Officer* *Director of the United States Patent and Trademark Office*